UNITED STATES PATENT OFFICE.

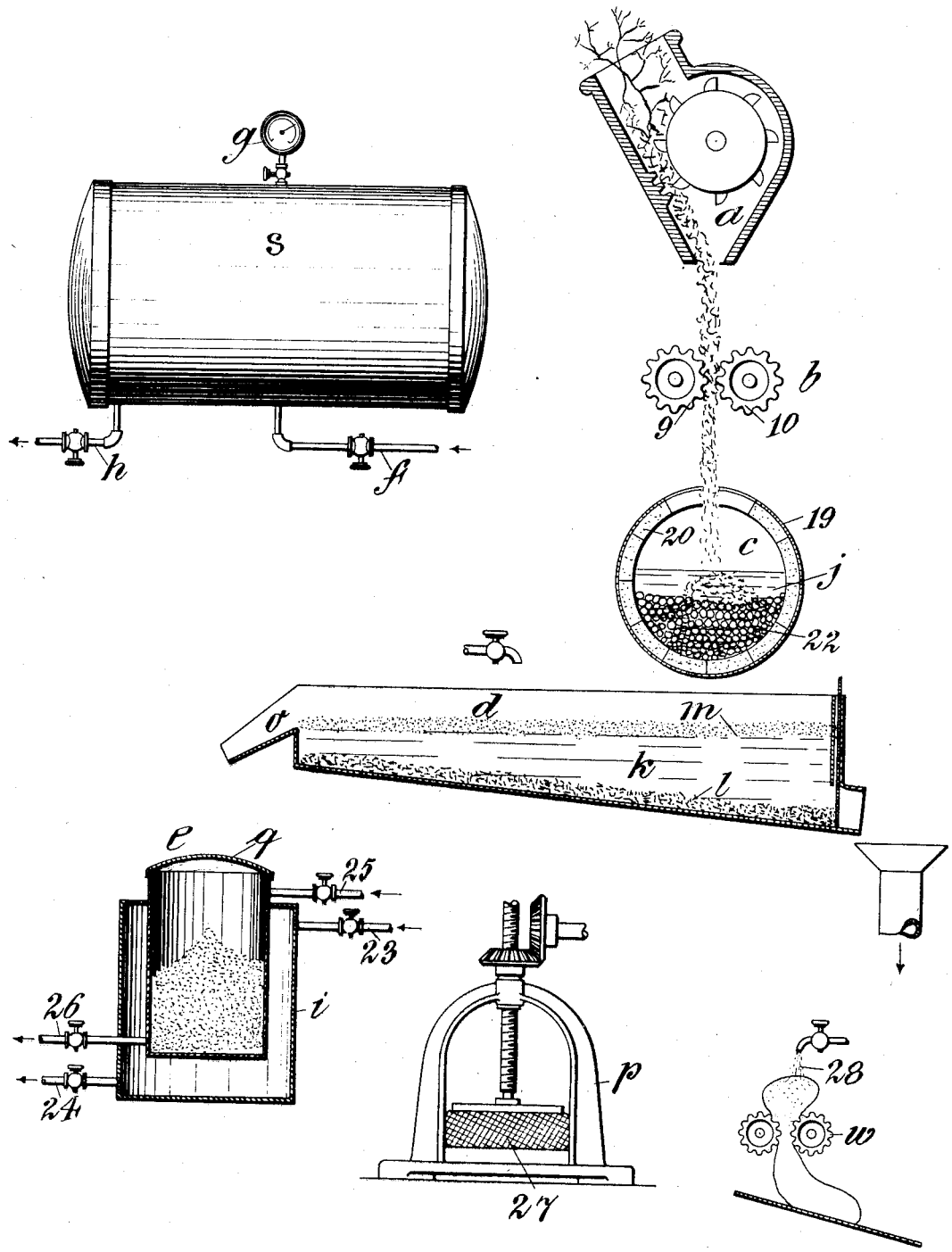

FELIX HERMANN HUNICKE, OF ROSELLE, NEW JERSEY, ASSIGNOR TO CONTINENTAL RUBBER COMPANY, A CORPORATION OF NEW JERSEY.

PROCESS OF EXTRACTING RUBBER-LIKE GUM FROM ITS VEGETABLE SOURCES.

No. 931,121.      Specification of Letters Patent.      Patented Aug. 17, 1909.

Application filed April 6, 1906, Serial No. 310,242. Renewed January 15, 1909. Serial No. 472,559.

*To all whom it may concern:*

Be it known that I, FELIX HERMANN HUNICKE, a citizen of the United States, and a resident of Roselle, in the county of Union, State of New Jersey, have made certain new and useful Improvements in Processes of Extracting Rubber-Like Gum from Its Vegetable Sources, of which the following is a specification.

This invention relates to the separation or extraction of gum or sap of a rubber like nature from plants and shrubs or other similar, original, vegetable sources.

The object of this invention is to improve the quality of commercial crude rubber and to decrease the cost of production thereof.

I prefer to use the guayule plant or shrub, which is found abundantly in Mexico, and the process of treatment consists in,—first, steaming the plant or shrub. Second: disintegrating, crushing or macerating the plant in the presence of water. Third: subjecting it to the action of a liquid, such as water, in which the disintegrated woody fiber and heavier impurities sink. Fourth: subjecting the rubber gum to heat and pressure which causes an agglomeration thereof. Fifth: washing the agglomerated mass in a rubber-washing machine, to separate the bark and other impurities therefrom.

The second above-named step to wit: the disintegrating, or crushing or macerating of the plant or shrub,—I prefer to divide into three sub-steps, that is, (a) cutting the source in a suitable cutting-machine; (b) crushing the source in a crushing-machine; and (c) disintegrating, crushing and macerating the source in a rotating or moving inclosure containing a collection of freely movable hard bodies causing attrition, in water, for a suitable time or period.

In the accompanying drawings there is shown, diagrammatically, an arrangement of apparatus useful in practicing the described method or process. There is a steaming device or tank $s$, in which the source, (the plants or shrubs as a whole) is heated. In this tank $s$ said source is subjected to the action of steam at about fifty pounds pressure, more or less, and for a period of say—one-half hour.

$f$ is the steam inlet; $g$ is the pressure gage; $h$ is the outlet.

The plant is next disintegrated, crushed or macerated; for this purpose it is passed through a cutting machine, like $a$, then a crushing-machine, like $b$, having rotating toothed surfaces 9 and 10; it is thence passed into what is called a pebble mill $c$; this is of the ordinary type, a metal drum 19 lined with brick 20, and is preferably about $3\frac{1}{2}$ feet long, and $4\frac{1}{2}$ feet in diameter, somewhat more than one-third filled with the pebbles 22; into this inclosure one hundred pounds of the crushed plant may be introduced in the presence of one hundred and twenty-five gallons of water $j$ (enough to cover the contents). The mill $c$ is then rotated about about an hour and a half. After passing through this pebble mill, the plant or shrub, thoroughly disintegrated, is next passed to a skimming tank $d$, where it is subjected to the action of a large body of water $k$ for a short time with occasional gentle agitation or stirring by a suitable tool in the hands of an attendant. The heavy woody fiber and any other heavy impurities, such as sand and dirt $l$, sink to the bottom of the tank, the floating mass $m$ is skimmed from the tank by skimmers or by the flow of water, by way of the outlet $o$ or in any equivalent manner. The mass leaving the tank $d$ is passed to a steam-heated vessel or tub $e$, where it is subjected to a high degree of heat; this steam-heated vessel $e$ is jacketed as at $i$, and has a cover $q$; steam enters the jacket $i$ at 23 and passes out at 24; steam enters the vessel $e$ at 25 and leaves at 26. The material is next conveyed to a suitable press $p$, which may be of the hydraulic or the ordinary screw variety, and the hot pulpy mass is here subjected to heavy pressure, being first placed in bags 27 or retaining boxes. The described heat and pressure operates to agglomerate the mass. It is next thoroughly washed in an ordinary rubber washing-machine $w$, while subjected to the action of a stream of water 28, which may be directed upon the mass in the usual and well known manner. This washing operates to clear the separated gummy mass from the bark and other light impurities, and the rubber is then dried and marketed in the usual manner.

The vegetable source of rubber-like gum, referred to in this specification, is understood to include all species of plants, shrubs or other vegetation, especially such as grow in the equatorial regions, and contain more or less rubber sap or similar substances, or gum, as well as any substances that may be used for similar purposes found in vegetable sources.

What I claim and desire to secure by Letters Patent is:

1. The herein described process of separating rubber like gum from its vegetable source which consists in softening the source by subjecting it to the action of steam in an inclosure; mechanically finely dividing the softened source, subjecting the finely divided source to the action of a series of independently moving, hard-surfaced bodies in an inclosure containing an excess of water, immersing the source in a body of water until the gum floats and the heavier impurities sink, then subjecting the gum to a high degree of heat and aqueous vapor under pressure in an inclosure.

2. The herein described process of separating rubber-like gum from its vegetable source which consists in softening the source by subjecting it to the action of steam in an inclosure, mechanically finely dividing the softened source, subjecting the finely divided source to the action of a series of independently moving, hard-surfaced bodies in an inclosure containing an excess of water, immersing the source in a body of water until the gum floats and the heavier impurities sink, subjecting the gum to a high degree of heat and aqueous vapor under pressure in an inclosure and then subjecting the gum to a heavy pressure.

3. The herein described process of separating rubber-like gum from its vegetable source which consists in softening the source by subjecting it to the action of steam in an inclosure, mechanically finely dividing the softened source, subjecting the finely divided source to the action of a series of independent, moving, hard-surfaced bodies in an inclosure containing an excess of water, immersing the source in a body of water until the gum floats and the heavier impurities sink, subjecting the gum to a high degree of heat and aqueous vapor under pressure in an inclosure, subjecting the gum to a high degree of pressure and then kneading the gum in the presence of water in motion.

4. The herein described process of separating rubber like gum from its vegetable source which consists in softening the source by subjecting it to the action of steam under pressure in an inclosure; cutting the source into small parts; crushing the source; disintegrating the source by subjecting it to the action of a series of independently moving, hard-surfaced bodies in an inclosure containing an excess of water; immersing the source in a body of water until the gum floats and the heavier impurities sink and subjecting the gum to a high degree of heat in aqueous vapor under pressure.

FELIX HERMANN HUNICKE.

Witnesses:
JOHN J. EVERS,
JULIAN A. WHITCOMB.